United States Patent [19]

Hoffman

[11] Patent Number: 4,531,084
[45] Date of Patent: Jul. 23, 1985

[54] POWER SUPPLY WITH CURRENT REGULATING CIRCUIT

[75] Inventor: Philip A. Hoffman, Towson, Md.

[73] Assignee: Solid State Chargers Research and Development Limited Partnership

[21] Appl. No.: 524,356

[22] Filed: Aug. 18, 1983

Related U.S. Application Data

[63] Continuation-in-part of Ser. No. 472,758, Mar. 7, 1983, Pat. No. 4,504,774.

[51] Int. Cl.³ .............................................. H02J 7/04
[52] U.S. Cl. ...................................... 320/39; 320/35; 320/53; 320/59; 323/278
[58] Field of Search .................... 320/1, 2, 9, 35, 39, 320/53, 57, 59, DIG. 1; 323/223, 265, 273, 278, 303, 311, 282

[56] References Cited

U.S. PATENT DOCUMENTS

| | | | |
|---|---|---|---|
| 3,530,367 | 9/1970 | Gardenghi | 323/313 |
| 3,582,713 | 6/1971 | Till | 323/278 |
| 3,735,233 | 5/1973 | Ringle | 320/39 |
| 3,889,171 | 6/1975 | Hunter, Jr. | 320/35 |
| 3,943,423 | 3/1976 | Hoffman | 320/22 |

OTHER PUBLICATIONS

Renak, Peter H., "Micropower Voltage Regulator with very low $V_{out}-V_{in}$" Electronic Engineering, Jun. 1980, vol. 52, No. 639, p. 19.

Primary Examiner—Peter S. Wong
Assistant Examiner—Anita M. Ault
Attorney, Agent, or Firm—Leonard Bloom

[57] ABSTRACT

A power supply which includes terminals for connection to an electric power source, a storage capacitance, an electrical charging circuit and an operative arrangement for connecting storage capacitance in series with the charging circuit across the terminals. The power supply has a charging circuit which includes a first resistor, a second resistor, a third resistor and a rectifier, constituted by at least one diode, in series. A first transistor, which has a collector-emitter path and a base-emitter path, is operatively connected so that the base-emitter path is connected in parallel with the first resistor. A fourth resistor is provided, the fourth resistor being connected in series with the collector-emitter path of the transistor and the third resistor. In one embodiment, a plurality of additional transistors, connected in Darlington configuration, includes a second transistor and a final transistor, each of the additional transistors having its collector connected to a circuit point between the third resistor and an electrode of the diode. The first transistor and the last transistor have their emitters connected via a current-limiting PTC fifth resistor which may act as a fuse. The first transistor and the second transistor have their respective collector and base conductively connected. The connection of the third resistor provides internal feedback. The fifth resistor, when in series with the first resistor in the base-emitter circuit, provides external feedback. A field-effect transistor, preferably a MOSFET, can replace the Darlington configuration.

56 Claims, 10 Drawing Figures

POWER SUPPLY WITH CURRENT REGULATING CIRCUIT

CROSS REFERENCE TO RELATED APPLICATIONS

This application is a continuation-in-part of patent application Ser. No. 472,758 now U.S. Pat. No. 4,504,774 filed on Mar. 7, 1983 and entitled "Current Regulating Circuit", which is incorporated herein in its entirety by reference.

FIELD OF THE INVENTION

The present invention relates to a power supply which includes a current regulating circuit especially adaptable for integrated circuit manufacture, and more particularly, to a power supply having a rectifying means and a current regulating circuit which may be fabricated as a relatively-small solid state component and operatively associated with a smoothing circuit, which may comprise a storage capacitor, as well as other output circuitry.

BACKGROUND OF THE INVENTION

While not restricted thereto, this invention finds immediate application in simple, inexpensive power supply circuits which are especially useful for powering small loads such as logic circuits, microprocessor chips and other small D.C. powered devices.

It is known from U.S. Pat. No. 3,943,423 to Philip A. Hoffman entitled "Battery Charging Circuit" and issued on Mar. 9, 1976 to provide a battery charging circuit which eliminates the need for a relatively bulky and heavy voltage step-down transformer, and which, when recharging batteries in a hand tool or the like, needs simply to be connected to a conventional, 117 volt 60 Hz household outlet and to the battery cell or cells which are to be recharged. Other outlet voltage levels and/or supply frequencies can be used as well. The known charging circuit of the aforesaid Hoffman patent comprises a variable resistance switch preferably realized in the form of a NPN junction transistor and Darlington-connected other transistors operatively associated with a feedback circuit. This known circuit has, in addition to the transistors and resistors, two rectifying diodes and two capacitors, resulting in a circuit which, particularly because of the need for the capacitors and a considerable number of passive components, becomes relatively more expensive to realize as an integrated circuit than the present invention and would be somewhat bulky and more expensive to miniaturize than the present invention using other techniques for incorporation into cordless devices.

It is known from the further U.S. Pat. No. 3,970,912 issued on Jul. 20, 1976 to Philip A. Hoffman and entitled "Battery Charging Circuit" to provide a battery charging circuit free of transformers and operatively arranged to produce current pulses which are supplied to the battery or batteries to be recharged via the inductance of an electric motor, which forms part of a cordless hand tool or the like. This circuit, while not requiring capacitors, does require at least two diodes and an inductance, albeit the inductance of an electric motor which is a portion of a powered hand tool or the like. As a result, this circuit has somewhat limited utility because of the requirement for an inductance, and, in particular, the inductance provided by a D.C. electric motor.

A considerable number of battery chargers have been proposed and are known from the general prior art including U.S. Pat. Nos. identified as follows:

| U.S. Pat. No. | Patentees | Issue Date |
| --- | --- | --- |
| 3,281,639 | Norman M. Potter | October 25, 1966 |
| 3,735,233 | Richard B. Ringle | May 22, 1973 |
| 3,876,921 | John H. Bigbee, III | April 8, 1975 |
| 4,013,934 | George J. Frye | March 22, 1977 |
| 4,140,958 | Charles R. Groeschel | February 20, 1979 |
| 4,158,813 | Robert W. Ellis et al. | June 19, 1979 |
| 4,162,439 | Arthur Schneider | July 24, 1979 |
| 4,186,335 | Harold J. Cahill | January 29, 1980 |
| 4,220,905 | William T. Quarton | September 2, 1980 |
| 4,266,178 | Tatsushi Asakawa | May 5, 1981 |
| 4,292,578 | Robert L. Steigerwald et al. | September 29, 1981 |
| 4,321,523 | Ronald O. Hammel | March 23, 1982 |
| 4,348,619 | Ray et al. | September 7, 1982. |

It is also known from Mims III "Engineer's Notebook A Handbook of Integrated Circuit Applications", First Edition, Second Printing, pg. 95, Radio Shack, A division of the Tandy Corporation, U.S.A. (1979) to use integrated circuits in battery chargers.

It is known from U.S. Pat. No. 3,049,623 to Wilber E. DuVall entitled "Auxiliary Power Supply" and issued on Aug. 14, 1962 to provide a power supply which includes a rectifier and storage capacitance, the latter being coupled to output terminals via transistor circuitry.

Voltage regulator circuits which are Zener diodes are widely used, examples can be seen in U.S. Letters Patents identified as follows:

| U.S. Pat. No. | Patentees | Issue Date |
| --- | --- | --- |
| 3,217,229 | Lyttleton W. Ballard | November 9, 1965 |
| 3,530,367 | Robert A. Gardenghi | March 7, 1969. |

SUMMARY OF THE INVENTION

An object of the present invention is to provide an improved power supply which includes a current regulating circuit for supplying current pulses to a smoothing circuit, which may comprise a storage capacitance.

Another object of the present invention is to provide a power supply circuit which is simple, inexpensive and can readily be realized, so far as its rectifying and current regulating components are concerned, as an integrated circuit.

An additional object of the present invention is to provide a power supply which is simple, inexpensive, small and lightweight.

A further object of the present invention is to provide a simple, inexpensive power supply which can be operated from a conventional 117 volt, 60 Hz, or 234 volt A.C., 60 Hz, power sources and which can be operated as well from power sources having different voltages and frequencies.

The foregoing objects, as well as others which are to become apparent from the text below, can be achieved in accordance with the present invention by providing in a power supply which includes a smoothing circuit, which may comprise a storage capacitance, and a current regulating circuit. The regulating circuit has terminals for connection to an electric power source and further including an electrical charging circuit and operative arrangements for connecting the smoothing circuit in series with the charging circuit across the terminals. In particular, the power supply is constituted by a charging circuit which a first resistance, a second resistance, and a third resistance connected in series as a combination in the denominated order. A rectifier, constituted by at least one diode, is connected in series with the combination. A first transistor, which has a collector-emitter path and a base-emitter path, is operatively connected so that the base-emitter path is connected in parallel with the first resistance. A fourth resistance is provided, the fourth resistance being connected in series with the collector-emitter path of the transistor and the third resistance. A plurality of additional transistors, connected in a Darlington configuration or array, includes a second transistor and a final transistor, each of the additional transistors having its collector connected to a circuit point between the third resistance and an electrode of the diode. The first transistor and the last transistor have their emitters connected via a fifth resistance, and the first transistor and the second transistor have their respective collector and base conductively connected.

In one embodiment, the end of the fifth resistance (which is connected to the emitter of the first transistor) is also connected to that end of the first resistance which is not connected to the base of the first transistor.

In another embodiment, the end of the fifth resistance (which is connected to the emitter of the last transistor) is also connected to the end of the first resistance (which is not connected to the base of the first transistor) for the purpose of providing external feedback.

In one aspect, the present invention is in a power supply which includes a smoothing circuit, which may comprise storage capacitance, and a current regulating circuit having rectification means, amplification means, and a feedback control circuit. The feedback control circuit includes a solid state means having first, second and third terminals, the third comprising a control terminal. The control circuit further includes first, second and third resistance. The first resistances has one end thereof connected to the first terminal and the other end thereof connected to the third control terminal of the solid state means. The second resistance has one end thereof connected to the third control terminal, and the third resistance is in series circuit with the smoothing circuit and the rectification means. The other end of the second resistor is connected the the other end of the third resistor.

In another aspect, the present invention is in a power supply which includes a smoothing circuit, which may comprise storage capacitance. A current regulating circuit adapted for integrated circuit manufacture and having rectification means, current amplification means, and a feedback control circuit is provided. The feedback control circuit includes solid state means having first, second and third terminals, the third comprising a control terminal. A first resistance has one end thereof connected to the first terminal and the other end thereof connected to the third control terminal of the solid state means. A second resistance has one end thereof connected to the control terminal. A third resistance has one end thereof connected to the rectification means, and the other end thereof connected to the other end of the second resistance. A fourth resistance has one end thereof connected to the other end of the third resistance, and the other end thereof connected to the second terminal of the solid state means. With this arrangement, the individual resistance values of the four resistances can vary substantially and are not nearly as important as the ratios between the first, second and third resistances to the fourth resistance, respectively. A fifth current-sensing resistance is connected between the amplification means and the control circuit. This fifth resistor has a positive temperature coefficient resistance which increases in value as the temperature increases, thereby limiting the current flow. Moreover, this fifth resistance is formed by a metallization technique during the integrated circuit manufacture and has a relatively small value compared to the values of the other resistances, whereby the fifth resistor serves as a fuse for fail safe operation of the circuit.

In an additional aspect, the invention constitutes an improvement in a power supply which includes a smoothing circuit, which may comprise a storage capacitance, and rectification means. Terminal means for connection to an electric power source, an electrical charging circuit, and means for connecting the smoothing circuit in series with the charging circuit across the terminal means. The improved charging circuit includes a first resistance, a second resistance and a third resistance connected in series in this denominated order. A first transistor has a collector-emitter path and a base-emitter path, the base-emitter path being connected in parallel with said first resistance. A fourth resistance is connected in series with the collector-emiiter path and a circuit point between the second resistance and the third resistance. A plurality of additional transistors are connected in a Darlington configuration and include a second transistor and a final transistor. The first transistor and the second transistor (part of the Darlington) have their respective collector and base conductively connected, and each of the additional transistors has its collector coupled to a circuit point remote from the circuit point between the third resistance and a second resistance. A fifth resistance is provided, and the last transistor and the first transistor have their emitters connected via this fifth resistance.

The present invention can be considered to be in a power supply which includes a smoothing circuit, which may comprise a storage capacitance. A control circuit includes, the combination of a first resistance, a second resistance, and a third resistance connected in series with each other. A transistor having a collector, emitter and base is provided, the base being connected to the junction of the first and second resistances, the emitter being connected to the other end of the first resistance. A fourth resistor having one end thereof connected to the junction of the second and third resistances and the other end thereof connected to the collector of the transistor is provided. The individual values of the first, second, third and fourth resistances can vary substantially without affecting the performance of the control circuit, and the exact values of the resistances are substantially less important than the ratios therebetween.

In another important aspect, the invention can be considered to be, in a power supply which includes a smoothing circuit, which may comprise a storage capacitor, and the charging circuit. The charging circuit is manufactured as an integrated circuit and defines the combination of a control circuit, an amplifier circuit, and a current sensing resistor therebetween, the current sensing resistor having a relatively low value and being formed by metallization techniques during the integrated circuit manufacture.

Further, the invention can also be considered, in a power supply comprising terminal means for connection to an electric power source, an electrical charging circuit, a smoothing circuit, which may include storage capacitance, and means for connecting the smoothing circuit in series with the charging circuit across said terminal means. The charging circuit includes a first resistance, a second resistance and a third resistance. Rectifying means, including at least one diode, connected in series with the aforesaid resistances connected in series in the denominated order. A first transistor has a collector-emitter path and a base-emitter path, the base-emitter path being connected in parallel with said first resistance. A fourth resistance is connected in series with the collector-emitter path and a circuit point between the second resistance and the third resistance. A plurality of additional transistors are connected in a Darlington configuration and include a second transistor and a final transistor. The first transistor and the second transistor have their respective collector and base conductively connected, and each of the additional transistors has its collector coupled to a circuit point between the third resistance and an electrode of the diode. A fifth resistance is provided, and the first transistor and the last transistor have their emitters connected via this fifth resistance, wherein the respective individual values of the first, second, third and fourth resistances can vary substantially and are not nearly as important as the ratios between the first, second and third resistances to the fourth resistance, respectively, and wherein the fifth resistance is very small compared to said other resistances and is formed by a metallization technique during the integrated circuit manufacture.

The invention can also be viewed as being, in a power supply having a smoothing circuit, which may include storage capacitance, terminal means for connection to an electric power source, an electrical charging circuit, and means for connecting the smoothing circuit in series with said charging circuit across said terminal means. The charging circuit includes a first resistance, a second resistance and a third resistance connected in series in the denominated order and rectifying means including at least one diode, connected in series with the combination. A control transistor has a collector-emitter path and a base-emitter path. The base-emitter path is connected in parallel with the first resistance. A fourth resistance is current in series with the collector-emitter path and a circuit point between the second resistance and the third resistance. Means are further provided, having a control electrode and controllable charging current carrying electrodes. The charging current carrying electrodes are connected in series with the diode, and the control transistor has its collector coupled to the control electrode.

In an important aspect, the invention can be viewed as a power supply which includes a rectifying circuit, which supplies unfiltered rectified voltage, a controlling circuit (current regulating circuit), which produces connect pulses, and a smoothing circuit, which provides a D.C. output, these circuits being connected in series. The controlling circuit is responsive to the instantaneous amplitude of the unfiltered rectified voltage, passing current to the smoothing circuit only during periods when the rectified voltage is between a first level defined by voltage across the smoothing circuit and a higher second level, the controlled circuit blocking passage of current during periods when the rectified voltage is greater than the second level. Thus short duration spikes of current are passed to the smoothing circuit, which provides a low voltage smooth D.C. output. The smoothing circuit may include as one of its components a storage capacitor or be constituted by same.

DETAILED DESCRIPTION OF THE PREFERRED EMBODIMENTS

Figure 1A:
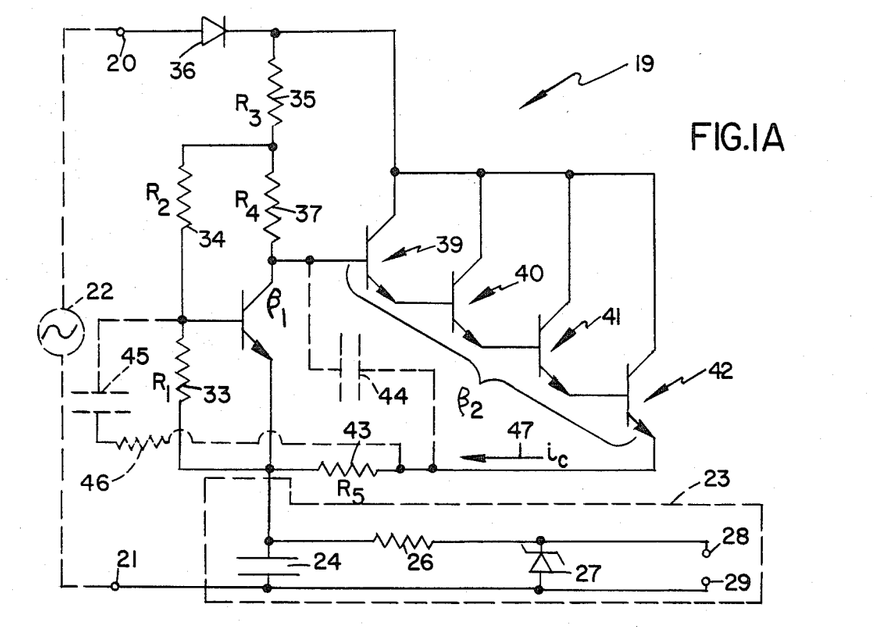
FIGS. 1A and 1B are respectively a circuit diagram of a first embodiment of a power supply according to the present invention and a variant thereof.
Figure 1B:
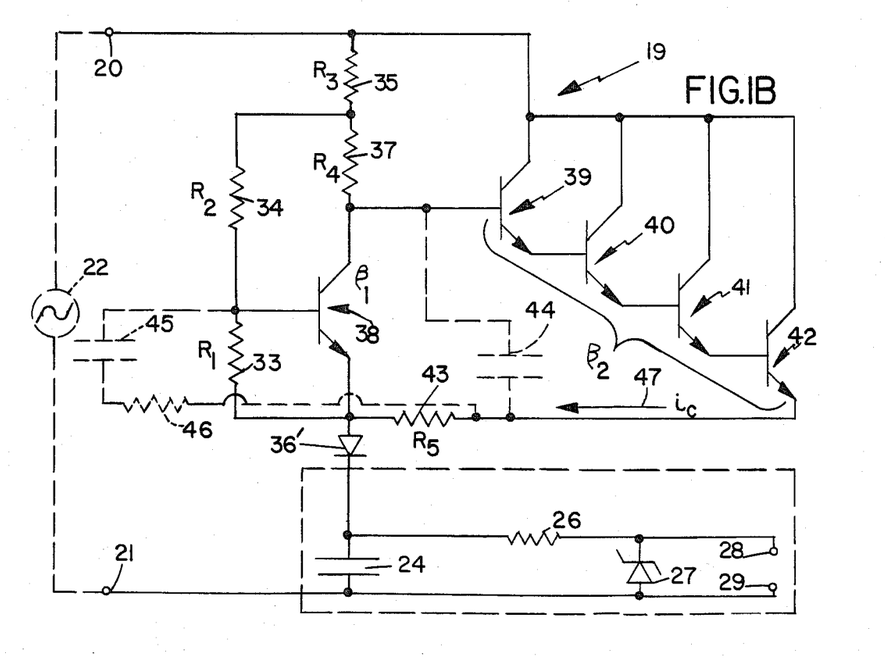

As illustrated in FIGS. 1A and 1B, the illustrative, first embodiment, as well as a variant thereof, of a power supply constructed in accordance with the present invention includes a current regulating circuit generally designated by the numeral 19 and includes a pair of terminals 20, 21 which are shown, for purposes of illustration, connected across a conventional, 117 volt 60 Hz voltage source 22. Also shown in FIGS. 1A and 1B is a smoothing circuit 23 which includes a 1000 $\mu$f storage capacitor 24 realized as an electrolytic capacitor having an electrode connected to the terminal 21. A 56 ohm resistor 26 and a Zener diode 27 are connected in series across the storage capacitor 24, output terminals 28, 29 of the power supply being connected across the Zener diode 27. The Zener diode 27 can be realized, for example, as a 9.1 volt diode designated by the numeral ECG 5018A. The current regulating circuit designated generally by the numeral 19 is connected between the smoothing circuit 23 and the terminal 20, placing the storage capacitor 24 in circuit so that it can receive current pulses from the current regulating circuit 19. The current regulating circuit 19 operates to charge the capacitor 24.

It is to be appreciated that the circuit illustrated in FIGS. 1A and 1B can be utilized to charge capacitors of considerably different sizes and voltage levels from sources of different levels and/or supply frequencies, the conventional 117 volt and 234 volt levels and 60 Hz frequency being set out by way of example only. The current regulating circuit 19 includes, a first resistor 33 (resistance $R_1$), a second resistor 34 (resistance $R_2$), a third resistor 35 (resistance $R_3$) and a rectifying diode 36 (FIG. 1A) or the rectifying diode 36' (FIG. 1B) connected between that plate of the capacitor 24 which is not connected to the terminal 21 and the terminal 20 of the charging circuit. As illustrated, the rectifying diode 36 (FIG. 1A) has its anode connected to the terminal 20 and its cathode connected to one end of the resistor 35. As shown in FIG. 1B, the rectifying diode 36' has its cathode connected to one of the plates of the capacitor 24, its anode being connected to the free end of the resistor 33. A fourth resistor 37 (resistance $R_4$) is connected between the connection point of the second resistor 34 and the third resistor 35 and the collector of an NPN transistor 38, which has its emitter connected to one end of the first resistor 33. The other end of the first resistor 33 is connected to the base of the transistor 38, as well as to one end of the second resistor 34. The transistor 38 and resistors 33, 34, 35 and 37 constitute the control stage of the current regulating circuit 19. The collector of the transistor 38 is connected, in turn, to a current amplifier which includes a Darlington connected series of NPN junction transistors 39-42. The Darlington connected transistors are selected so as to provide a relatively high current gain, for example, a current gain ($\beta_2$) of approximately 200,000, while the control stage which includes the transistor 38 is selected to also have a current gain ($\beta_1$), for example, of about 100. The collectors of each of the transistors 39-42 are connected to the cathode of the rectifying diode 36 (FIG. 1A) or to the terminal 20 of the power supply 22 (FIG. 1B). The base of the first of the transistors 39-42, that is the transistor 39 is connected to the collector of the switching transistor 38. The emitter of the final one of the Darlington-connected transistors 39-42, that is the transistor 42, is connected to one plate of the capacitor 24 and to the emitter of the transistor 38, via a current-limiting fifth resistor 43 ($R_5$). The current-limiting fifth resistor 43 is a positive temperature coefficient (PTC) resistance, formed by metallization from materials which are selected so that this resistor will also function as a fuse, allowing circuit failure without change to the battery undergoing recharging and endangering the surroundings. The current regulating circuit 19 illustrated in FIGS. 1A and 1B, is not provided with external feedback between the output of the current amplifier constituted by the Darlington circuit configured transistors 39-42 and the switching transistor 38; however, internal feedback is provided by the third resistance 35 because of its coupling to the base of the transistor 38 via the second resistance 34 and the first resistance 33 connected as illustrated.

In order to avoid the possibility of the circuits 19 oscillating, a small capacitance 44 may be connected between the collector of the transistor 38 and the emitter of transistor 42 and/or a series connection of a small capacitor 45 and a resistor 46 is connected between the base of the transistor 38 and the emitter of the transistor 42.

By way of example only, typical values for circuit parameters of the battery charging circuit illustrated in FIGS. 1A and 1B, which would be used in an exemplary integrated circuit embodiment are:

| | | |
|---|---|---|
| $R_1 =$ | 8,946 ohms, | $i_a = .12$ ampere (average), |
| $R_2 =$ | 120,543 ohms, | $i_p = 5.0$ ampere (peak), |
| $R_3 =$ | 54,668 ohms, | $\beta_1 = 100$ (current gain, control stage), |
| $R_4 =$ | 13,667 ohms, | $\beta_2 = 200,000$ (current gain, current amplifier). |
| $R_5 =$ | .385 ohms, | |

It is to be appreciated that the individual values for the resistances $R_1$-$R_4$ can vary considerably, as a practical matter by about ±20 percent, the exact values for resistances $R_1$-$R_4$ not being nearly as important as the ratios among them. The ratios of $R_1$:$R_4$, $R_2$:$R_4$ and $R_3$:$R_4$, in a practical case, should desirably be within the range of substantially ±5 percent and preferably substantially ±1 percent. These criteria make it possible to realize the charging circuits 19 of FIGS. 1A and 1B as integrated circuits using diffusion techniques. It is conceived that the integrated circuit, in an exemplary practical realization can be contained within a small housing preferably of cylindrical shape and having a length of about 3/16 inch and a diameter of about 5/36 inch. Two concentric wire leads each of about one inch can be provided to extend from the housing. The smoothing circuit 23, except for the storage capacitor 24, may be part of the integrated circuit, and preferably is part thereof.

Accordingly, expressing the above-mentioned ratios as constants $K_1$, $K_2$ and $K_3$, respectively, we have: $K_1 = 0.65 \pm 0.03 = R_1/R_4$, $K_2 = 8.82 \pm 0.44 = R_2/R_4$, and $K_3 = 4.00 \pm 0.20 = R_3/R_4$; or, as the preferred case is, $K_1 = 0.65 \pm 0.006$, $K_2 = 8.82 \pm 0.088$ and $K_3 = 4.00 \pm 0.04$.

The fifth resistance $R_5$ need not be in a particular ratio with respect to the other resistances and can readily be formed by metallization and be constituted by a metal contact to or between circuit points. The resistance $R_5$ is desirably a positive temperature coefficient (PTC) resistance, which increases in value as temperature increases, thus limiting current flow. The size of resistance $R_5$, relative to the sizes of resistance $R_1$-$R_4$, is very small. The resistance $R_5$ acts to stabilize the current regulating circuit which, in a practical case, operates at a temperature of about 125° C. during charging when the chip is provided with a suitable thermal mounting. Charging current will decrease with an increase in ambient temperature of approximately forty-five hundredths of one percent (0.45%) per degree Centigrade.

Figure 5A:
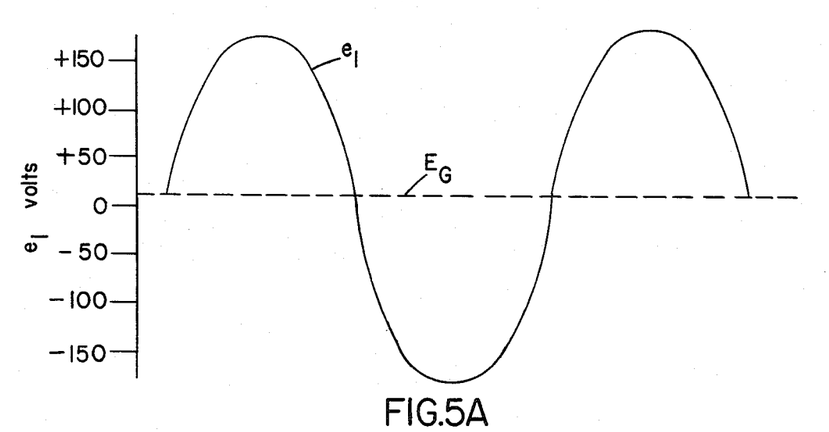
FIGS. 5A-5C are voltage and current waveforms at various locations in the circuits illustrated in FIGS. 1A, 1B, 2, 3 and 4 are helpful in understanding the operation thereof.
Figure 5B:
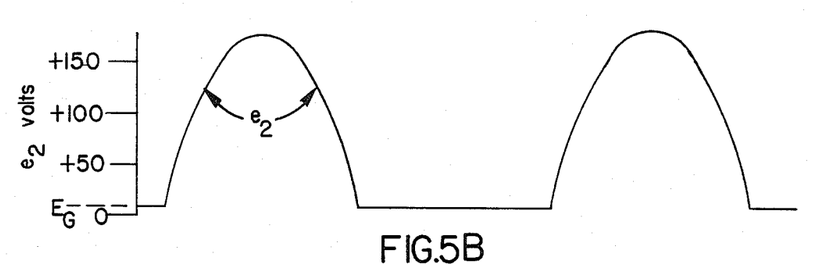
Figure 5C:
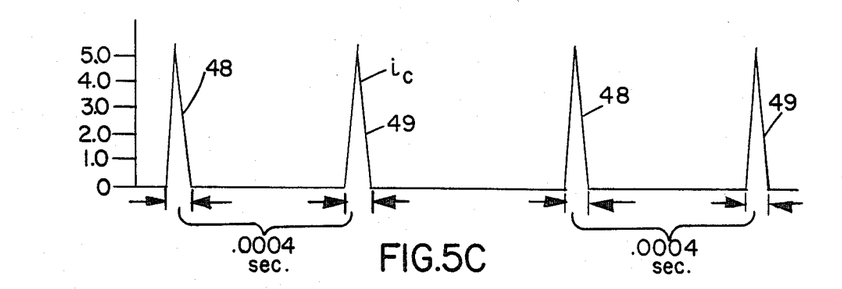

In operation, the circuit arrangement shown in FIGS. 1A and 1B are placed in operation by connecting the current regulating circuit 19 to the voltage source 22 which is shown as connected between the input terminals 20,21 of the current regulating circuit 19. The capacitor 24 to be charged is connected between the terminal 21 and the current regulating circuit 31 (its voltage being illustrated in FIGS. 5A and 5B as $E_b$). FIG. 5A shows the voltage waveform $e_1$ as a function of time of the input source voltage 22 for a conventional 117 volt (rms), 60 Hz household outlet supply. FIG. 5B is a waveform $e_2$ of the rectified voltage at the output of the rectifier diode 36 (FIG. 1A); in the variant illustrated in FIG. 1B, the rectifier diode 36' would rectify the opposite half cycles so that waveform $e_2$ would correspond with the downward excursions of waveform $e_1$. The voltage waveforms as shown in FIGS. 5A and 5B are illustrated for one and one-half cycles of the 60 Hz input. FIG. 5C is a corresponding waveform of the charging current $i_c$, during operation after the stable operating temperature of about 125° C. has been reached, as indicated by the arrow 47 shown in FIGS. 1A and 1B through the fifth resistor 43 and into capacitor 24. As can be seen in FIG. 5C, there are two current spikes 48, 49 for each cycle of A.C. input, the peak charging current $i_p$ being about 5.0 amperes. These current spikes 48, 49, as can be seen, are relatively short in duration, for example about 0.0004 seconds, resulting in an average charging current $i_a$ of about 0.12 ampere.

Referring again to FIGS. 1A, 1B, the diode 36 (FIG. 1A) or the diode 36' (FIG. 1B) provides a source of input current for the Darlington configured current amplifier defined by the transistors 39-42, as well as operating voltage for the switching transistor 38 of the control stage. Initially, relatively high current spikes are produced, causing the PTC resistor 43 to increase in value, because of heating thereof, resulting in the current spikes having lesser magnitudes as they approach the 5.0 ampere level and the chip achieves its stable operating temperature of about 125° C. Thereafter, when the A.C. voltage $e_1$ of the source 22 is positive and slightly greater, for example less than 2.6 volts with respect to the voltage $E_b$ of the capacitor 24 which is to be charged, the transistors 38 and 39-42 do not conduct. When the voltage difference reaches about 2.6 volts, capacitor charging current starts to flow through the transistors 39-42, illustrated as the leading edge of the current spike 48 in FIG. 5C. The current into the base of the transistor 39 in effect is amplified by the transistors 39-42 and initially flows at a relatively low level, through the fifth resistor 43 into the capacitor 24 thereby starting to charge the capacitor 24 as the leading edge of the current spike 48 starts toward the 5.0 ampere level. This current, illustrated as current spike 48, can be considered to be increasing as the voltage supplied to the collectors via the rectifying diode 36 (FIG. 1A) or the rectifying diode 36' (FIG. 1B) becomes more positive and reaches its peak of about 5.0 amperes when the line voltage $e_1$ is about 10 volts greater than the capacitor voltage $E_b$. Increasing current is supplied not only to the Darlington connected transistors 39-42, but also to the base of the transistor 38, via the voltage divider consisting of the first resistor 33, the second resistor 34 and the third resistor 35, which are connected in series, as pointed out above, between the diode 36 (FIG. 1A) and one plate of the capcitor 24 or between the diode 36' (FIG. 1B) and the terminal 20 of the source 22. Once the current into the base of the transistor 38 is sufficient, when the line voltage $e_1$ reaches the level of about 10.0 volts greater than the voltage $E_b$ of the capacitor 24, to turn this transistor on, considerable current starts to flow through the emitter-collector path thereof, reducing the voltage, and thus the current, supplied to the base of the transistor 39 causing the current amplifier, consisting of the transistors 39-42 connected in Darlington configuration, to exhibit reduced current flow, as illustrated by the trailing edge of the current spike 48 in FIG. 5C and quickly turn off the resulting current spike 48 which has a duration of about 0.0004 second. The transistors 39-42 are turned off when the line voltage $e_1$ reaches a difference of about 27.6 volts with respect to storage capacitor voltage $E_b$. During this time period, because of the internal feedback provided as a result of the lowering of the voltage, at the point of connection between the second resistor 34 and the third resistor 35, the effective resistance of the transistor 38 increases. The transistors 39-42 are again turned on when the difference between the line voltage again reaches, as it falls, about 27.6 volts with respect to the storage capacitor voltage $E_b$ while the transistor 38 is conducting, with the result of the leading edge of the current spike 49 of FIG. 5C is produced, this current spike reaching a peak of about 5.0 amperes when the voltage difference between the voltage $e_1$ and the storage capacitor voltage $E_b$ again reaches about 10 volts. The transistors 39-42 remain conducting until the difference between the input voltage $e_1$ and the storage capacitor voltage $E_b$ again reaches about 2.6 volts. Thus current spike 49 of about 5.0 amperes and 0.0004 second duration is produced. These actions take place every other half cycle of the input voltage $e_1$ with the result that the two current spikes 48, 49 are produced, one at the starting portion and the other at the ending portion of each of these half cyles. Thus, a charging current spike is produced for a short period of time, for example, of about 0.0004 seconds as indicated above during an initial portion of the rectified half-wave voltage output $e_2$ from the rectifying diode 36 (FIG. 1A) or the diode 36' (FIG. 1B) and another current spike during its terminal portion, both spikes have a duration of about 0.0004 seconds as indicated above. These actions take place time and time again providing, in effect, a charge in the form of current spikes to the capacitor 24 which continue until the capacitor 24 is fully charged. During this time, the capacitor may be discharging, via the output terminals 28, 29, into a load, the Zener diode 27 providing a regulated output voltage.

It is to be appreciated that were a 234 Volt, 60 $H_z$ source used instead of the 117 Volt 60 $H_z$ source (and if the effects of temperature changes within the circuit are ignored), the peak amplitude of current spikes 48, 49 (FIG. 5C) would not change but the time duration of these current spikes and the average current would be halved. However, in practice, the operating temperature of the circuit at the higher source voltage would be less than when the source is 117 Volts, thereby decreasing the value of the PTC resistor 43 and increasing the peak amplitude of the current spikes 48, 49. In addition, the lower circuit temperature would increase the gate-emitter threshold voltage of transistor 38 (FIGS. 1A, 1B) thereby tending to increase both the duration of the current spikes and the peak amplitudes of the current spikes. As a result of the lowered circuit temperature when the device is operated at higher source voltages, the reduction in average current is considerably less than would be the case if the circuit temperature were to remain constant.

Figure 2:
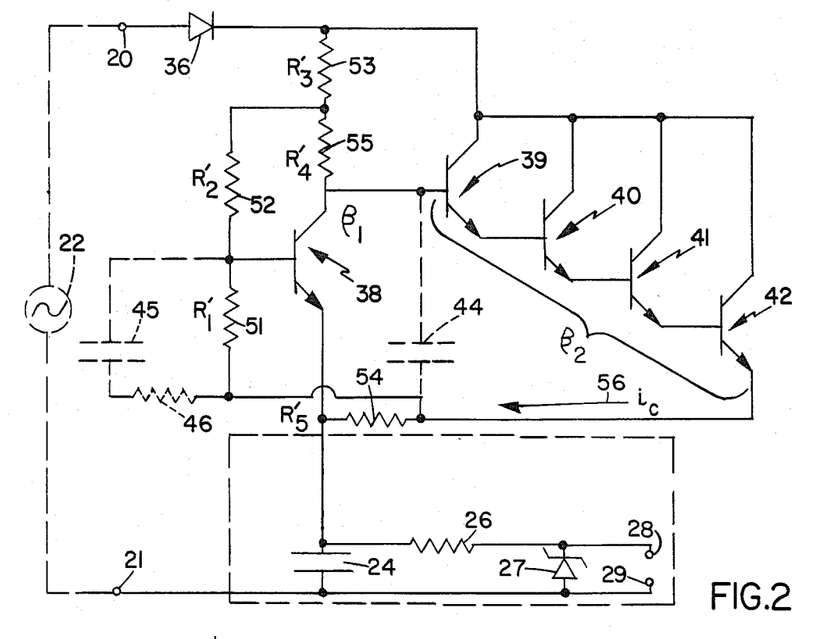
FIG. 2 is a circuit diagram of a second embodiment of a power supply according to the present invention.

As illustrated in FIG. 2, like reference numerals designating like circuit components to those shown in FIGS. 1A and 1B, the illustrative, second embodiment of a power supply circuit constructed in accordance with the present invention is generally designated by the numeral 50 and includes a pair of terminals 20, 21 which are shown, for purposes of illustration, connected across a conventional, 117 volt, 60 Hz voltage source 22. Also shown in FIG. 2 is a smoothing circuit 23 which includes a 1000 μf storage capacitor 24, which may be an electrolyte capacitor. The capacitor 24 is connected between the terminal 21 and the emitter of the transistor 38. A 56 ohm resistor 26 and a Zener diode 27 are connected in series across the storage capacitor 24, output terminals 28, 29 of the power supply being connected across the Zener diode 27, the Zener diode 27 can be realized, for example, as a 9.1 volt diode designated by the numeral ECG 5018A. The current regulating circuit designated generally by the numeral 50 is connected in series with the capacitor 24 across the terminals 20, 21.

The basic circuit 50, as illustrated in FIG. 2, can be used to charge capacitors from 117 volt, 60 Hz power supplies and from 234 volt, 60 Hz power supplies. It is to be appreciated, however, that the charging circuit illustrated in FIG. 2 can be utilized to charge capacitors in a power supply of considerably different voltage levels and itself have different levels and/or supply frequency, the above-mentioned levels and frequency being set out by way of example only. The current regulating circuit 50 includes, a first resistor 51 (resistance $R'_1$) and a second resistor 52 (resistance $R'_2$), a third resistor 53 (resistance $R'_3$) may be included if internal feedback is desired, in series with a rectifying diode 36, connected between the stationary contact 31 of the switch 25, via a current-limiting further resistor 54 (resistance $R'_5$) and the terminal 20 of the circuit. As illustrated, the rectifying diode 36 has its anode connected to the terminal 20 and its cathode connected to one end of the third resistor 53. As in the case illustrated in FIG. 1B, a variant of the circuit of FIG. 2 is possible by replacing the diode 36, with a rectifying diode connected between one plate of the capacitor 24 and the circuit connection between the resistor 54 with the emitter connection of the transistor 38. A fourth resistor 55 (resistance $R'_4$) is connected between the connection of the second resistor 52 and the third resistor 53 and the collector of the NPN transistor 38, which has its emitter connected to the stationary contact 31 of the manually operated switch 25 and, via the fifth resistor 54, to one end of the first resistor 51, which has its other end connected to the base of the transistor 38, as well as to one end of the second resistor 52. The transistor 38 and the resistors 51-55 constitute the control stage of the current regulating circuit 50. In the event the third resistor 53 is not present, the resistance $R'_3$ being zero, and the ends of the resistor 52 and the resistor 55 not connected to electrodes of the transistor 38 would be connected directly to the cathode of the diode 36. In this case, only external feedback would be provided. The collector of the transistor 38 is connected, in turn, to a Darlington configured series of NPN junction transistors 39-42. The Darlington configured transistors 39-42 are selected so as to provide a relatively high current gain, for example, a current gain ($\beta_2$) of approximately 200,000, while the transistor 38 of the control stage is selected to also have in circuit a relatively high current gain ($\beta_1$), for example, a gain of about 100. The collectors of each of the transistors 39-42 are connected to the cathode of the rectifying diode 36. The base of the first of the transistors 39-42, that is the transistor 39, is connected to the collector of the transistor 38. The emitter of the final one of the Darlington-connected, current amplifying transistors 39-42, that is the transistor 42, is connected to the emitter of the control transistor 38, via the fifth resistor 54. The current regulating circuit 50 illustrated in FIG. 2, is provided with external feedback between the output of the amplifier constituted by the Darlington circuit configured transistors 39-42 and the switching transistor 38 via the fifth resistor 54 which has its end not connected to the capacitor 24 connected to that end of the first resistor 51 which is not connected to the base of the transistor 38. Additional internal feedback is provided, as in the embodiment illustrated in FIGS. 1A and 1B, by virtue of the third resistor 53 (resistor 35, FIGS. 1A and 1B) because of its coupling to the base of the transistor 38, as illustrated.

Figure 3:
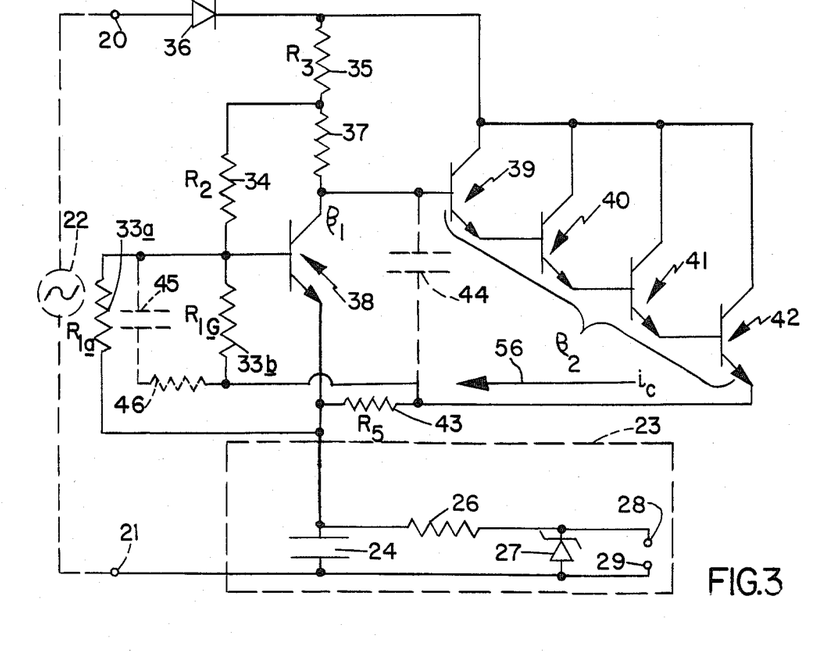
FIG. 3 is a circuit diagram of a third embodiment of a power supply according to the present invention incorporating features of the first and second embodiments.

Again, by way of example only, typical values for circuit parameters of the charging circuit illustrated in FIG. 3, which could be used in an integrated circuit embodiment are:

| | | | |
|---|---|---|---|
| $R'_1 =$ | 7,640 ohms, | $i_a =$ | .12 ampere (average), |
| $R'_2 =$ | 102,740 ohms | $i_p =$ | 5.0 ampere (peak), |
| $R'_3 =$ | 53,440 ohms, | $\beta_1 =$ | 100 (current gain, control stage), |
| $R'_4 =$ | 13,360 ohms, | $\beta_2 =$ | 200,000 (current gain, current amplifier). |
| $R'_5 =$ | .110 ohms, | | |

As in the embodiment illustrated in FIGS. 1A, 1B, the individual values for the resistances $R'_1$-$R'_4$ can vary considerably, as a practical matter by about ±20 percent, the exact values for resistances $R'_1$-$R'_4$ not being as important as the ratios among them. The ratios of $R'_1:R'_4$, $R'_2:R'_4$ and $R'_3:R_4$, in a practical case should desireably be within the range of substantially ±5 percent and preferably substantially ±1 percent. These criteria make it possible to realize the current regulating circuit 50 of FIG. 2 as an integrated circuit using diffusion techniques, the same dimensional characteristics mentioned in conjunction with the embodiment illustrated in FIGS. 1A and 1B applying equally well to this embodiment. Accordingly, expressing the above-mentioned ratios as constants $K'_1$, $K'_2$ and $K'_3$, respectively, we have $K'_1=0.57\pm0.03=R'_1/R'_4$, $K'_2=7.69\pm0.38=R'_2/R'_4$, and $K'_3=4.00\pm0.02=R'_3/R'_4$; or, as the prefered case is: $K'_1=0.57\pm0.066$, $K'_2=7.69\pm0.076$, and $K'_3=4.00\pm0.04$.

The resistance $R_5$ need not be in a particular ratio with respect to the other resistances and can easily be formed by metallization and be constituted by a metal contact to or between circuit points. As in the cases of FIGS. 1A and 1B, the resistance $R_5$ is desirably, a positive temperature coefficent (PTC) resistance, which increases in value as the temperature increases, thus limiting the current flow and serving to stabilize the circuit which in a practical integrated circuit version may operate at a chip temperature of about 125° F. during battery charging when the chip is provided with a suitable thermal mounting. The PTC resistor 54 ($R'_5$) is preferably formed by metallization with materials which are selected so that the resistor will also function as a fuse, allowing the circuit to fail without damaging the capacitor 24 undergoing charging, the other components of the smoothing circuit 23 and the device or devices connected to the terminals 28, 29, and endangering the surroundings. Charging current will decrease with an increase in ambient temperature of approximately ¼ percent per degree Fahrenheit.

In order to avoid the possibility of the circuit 50 oscillating, a small capacitance 44 may be connected between the collector of the transistor 38 and the emitter of the transistor 42 and/or a series connection of a small capacitor 45 and a resistor 46 may be connected between the base of the transistor 38 and the emitter of the transistor 42.

In operation, the circuit arrangement shown in FIG. 2 is placed in operation by connecting the current regulating circuit 50 in series with the capacitor 24 to the voltage source 22 which is shown as connected between the input terminals 20,21 of the circuit. The capacitor 24 to be charged is connected between the terminal 21 and the emitter of the transistor 38. FIG. 5A shows the voltage waveform $e_1$ as a function of time of the input source voltage 22 for a conventional 117 volt rms, 60 Hz household outlet supply. FIG. 5B is a waveform $e_2$ of rectified voltage at the output of the diode 36. The voltage waveforms as shown in FIGS. 5A and 5B are illustrated for one and one-half cycles of the 60 Hz input. FIG. 5C is a corresponding waveform of the charging current indicated by the arrow 56 shown in FIG. 2, through the fifth resistor 54 and into the capacitor 24 subsequent to the chip reaching its stable operating temperature of about 125° F. and the PCT resistor achieving its stable value in the manner set out above in connection with discussion of the operation of the circuit of FIGS. 1A and 1B. As can be seen in FIG. 5C, there are two current spikes 48, 49 for each cycle of A.C. input. These current spikes, as can be seen, are relatively short in duration.

In one practical version of the circuit illustrated in FIG. 2, it was found that the current spikes 48, 49 may reach, as illustrated in FIG. 5C, a magnitude of about 5.0 amperes or thereabouts after operating temperature has been reached, so as to provide an average charging current of approximately 0.12 ampere, the current spikes 48, 49 each being of about 0.0004 second duration.

Referring again to FIG. 2, the diode 36 provides a source of input current for the Darlington configured current amplifier composed of the transistors 39–42, as well as operating voltage for the transistor 38 of the control stage. When the A.C. voltage source 22 ($e_1$) is positive and slightly greater, for example about 2.6 volts greater than the battery potential $E_b$ of the capacitor 24 which is to be recharged, the transistor 38 does not conduct, yet current, at this voltage difference, flows through the resistors 53 and 55 into the base of the transistor 39. This current is amplified by the transistors 39–42 and flows through the fifth resistor 54 into the capacitor 24 thereby starting to charge the capacitor as the leading edge of current spike 48 starts toward the 5.0 ampere level. This current can be considered to be increasing as the voltage supplied via the rectifying diode 36 becomes more positive and reaches its peak of about 5.0 amperes when the line voltage is about 10 volts greater than the voltage $E_b$ of the capacitor 24 being charged. The control transistor 38 starts to conduct at this voltage level, its emitter-collector current flowing through the resistors 53, 55 resulting in a reduction of voltage applied to the base electrode of the transistor 39 and, consequently, in a decrease in the charging current $i_c$ as illustrated by the trailing edge of the current spike 48. Increasing current is supplied, as the difference between the potential $E_b$ of the capacitor 24 and the voltage $e_1$ source 22 to the base of the transistor 38, via the voltage divider consisting of the fifth resistor 54, the first resistor 51 and the second resistor 52, as well as the third resistor 53 if present, which are connected in series, as pointed out above, between the diode 36 and one plate of the capacitor 24. Once the current into the base of the transistor 38 is sufficient, which occurs as pointed out when the difference between the line voltage $e_1$ and capacitor voltage $E_b$ reaches a level about 10.0 volts, to turn this transistor on, considerable current starts to flow through the emitter-collector path. As the voltage difference increase still further, that is toward 27.6 volts, the voltage, and thus the current, supplied to the base of the transistor 39 decreases causing the current amplifier consisting of the transistors 39–42, connected in Darlington configuration to be reduced and the transistors 39–42 are quickly turned off when the difference reaches 27.6 volts. The control transistor 38 continues to conduct and the transistors 39–42 remain off as the voltage difference between the capacitor voltage $E_b$ and the line voltage $e_1$ becomes still greater. The charging current reached a peak level of about 5.0 amperes as illustrated by current spike 48 in FIG. 5C, the duration of the current spike 48 being about 0.0004 seconds. This action takes place during an initial portion of the half-wave voltage output from the rectifying diode 36. As the voltage difference between the line voltage $e_1$ and the capacitor voltage $E_b$ increases still further and then becomes less, again reaching about 27.6 volts, the transistors 39–42 are again turned on producing the leading edge of current spike 49, which spike is limited to a maximum of about 5.0 amperes, at this point the difference between the line voltage $e_1$ and capacitor voltage $E_b$ again reaches 10 volts. Later, as the half-wave voltage output from the diode 36 falls further, the current provided to the base-emitter path of the transistors 39–42 falls as well, finally reaching a point where it is insufficient to keep the transistor 38 and the transistors 39–42 in the conductive state. This condition is reached when the difference between the line voltage $e_1$ and the capacitor voltage $E_b$ again reaches about 2.6 volts. These actions take place time and time again providing, in effect, a charge current in the form of current spikes 48, 49 to the capacitor 24 and can continue until the capacitor is fully charged. As in the first embodiment, in both variant forms, the capacitor 24 may be discharging during this time, via the resistance 26 and the output terminals 28, 29 into a load, the Zener diode 27 providing a regulated voltage output.

In operation, the external feedback provided by the fifth resistor 54 as connected and the internal feedback provided by the third resistor 53 if present as connected can be considered, in effect, to vary the resistance of the control stage and cause the transistor 38 to limit current flow in the transistor 39–42 to periods when relatively low voltages are present and to, in effect, turn the transistors 39–42 off during times higher voltages are present.

As illustrated in FIG. 3, a third embodiment, a power supply constructed in accordance with the present invention includes a current regulating circuit generally designated by the numeral 57 and includes a pair of terminals 20, 21 which are shown, for purposes of illustration, connected across a conventional, 117 volt 60 Hz voltage source 22. Also shown in FIG. 3 is a smoothing circuit 23 which includes a 1000 μf storage capacitor 24 realized as an electrolytic capacitor connected between the terminal 21 and the emitter of a transistor 38. A 56 ohm resistor 26 and a Zener diode 27 are connected in series across the storage capacitor 24, output terminals 28, 29 of the power supply being connected across the Zener diode 27. The Zener diode 27 can be realized, for example, as a 9.1 volt diode designated by the numeral ECG 5018A. The current regulating circuit designated generally by the numeral 57 is connected in series with the storage capacitor 24 across the terminals 20, 21 so that it can receive current pulses from the current regulating circuit 57.

It is to be appreciated that the circuit illustrated in FIG. 3 can be utilized to charge capacitors of considerably different sizes and voltage levels from sources of different levels and/or supply frequencies, the conventional 117 volt and 234 volt levels and 60 Hz frequency being set out by way of example only. The current regulating circuit 57 includes, a first resistive impedance defined by resistors 33a and 33b considered to be connected in parallel and hereinbelow referred to as the "first resistor" (resistance $R_1$), a second resistor 34 (resistance $R_2$), a third resistor 35 (resistance $R_3$) and a rectifying diode 36 connected between one plate of the capacitor 24 and the terminal 20 of the charging circuit. As illustrated, the rectifying diode 36 has its anode connected to the terminal 20 and its cathode connected to one end of the resistor 35. It is to be understood, however, that the diode 36 shown in FIG. 3, could be replaced, as shown in FIG. 1B, by the rectifying diode 36' having its cathode connected to one plate of the capacitor 24, its anode being connected to the free end of the resistor 33a. A fourth resistor 37 (resistance $R_4$) is connected between the connection point of the second resistor 34 and the third resistor 35 and the collector of an NPN transistor 38, which has its emitter connected to the stationary contact 31 of the manually operated switch 25 and to one end of the resistor 33b. The other end of the resistor 33b is connected to the base of the transistor 38, as well as to one end of the second resistor 34. The transistor 38 and resistors 33a, 33b, 34, 35 and 37 constitute the control stage of the current regulating circuit 57. The collector of the transistor 38 is connected, in turn, to a current amplifier which includes a Darlington connected series of NPN junction transistors 39–42. The Darlington connected transistors are selected so as to provide a relatively high current gain, for example, a current gain ($\beta_2$) of approximately 200,000, while the control stage which includes the transistor 38 is selected to also have a current gain ($\beta_1$), for example, of about 100. The collectors of each of the transistors 39–42 are connected to the cathode of the rectifying diode 36 (or to the terminal 20 of the power supply 22 in the event the circuit is modified by replacing the diode 36 with the diode 36' as shown in FIG. 1B). The base of the first of the transistors 39–42, that is the transistor 39 is connected to the collector of the switching transistor 38. The emitter of the final one of the Darlington-connected transistors 39–42, that is the transistor 42, is connected to the stationary contact 31 of the manually-operated switch 25 and to the emitter of the transistor 38, via a current-limiting fifth resistor 43 ($R_5$). The current-limiting fifth resistor 45 is a positive temperature coefficient (PTC) resistance, formed by metallization from materials which are selected so that this resistor will also function as a fuse, allowing circuit failure without changing to the capacitor undergoing charging and endangering the surroundings. The current regulating circuit 57 illustrated in FIG. 3, is provided with external feedback between the output of the current amplifier constituted by the Darlington circuit configured transistors 39–42 and the switching transistor 38 by the connection between the resistor 43 and the resistor 33b. Internal feedback is provided by the resistor 35 because of its coupling to the base of the transistor 38 via the resistor 34 and the 33a connected as illustrated. For purposes of selecting values of the resistances $R_2$–$R_4$ and the resistance $R_1$ (which may be calculated as the effective resistance of resistors 33a and 33b connected in parallel, resistor 43 being very small) as well as the ratios and ranges thereof, the criteria and calculations associated with the circuit of FIG. 1A are applied, as indicated below in detail.

As in the embodiments illustrated in FIGS. 1A, 1B and 2, in order to assure the circuit will not, under some circumstances undesirably oscillate, a small capacitor 44 and/or series connection of a small capacitor 45 and a resistor 45 may be connected as shown in FIG. 3 in the same fashion as illustrated in FIGS. 1A, 1B and 2.

Figure 4:
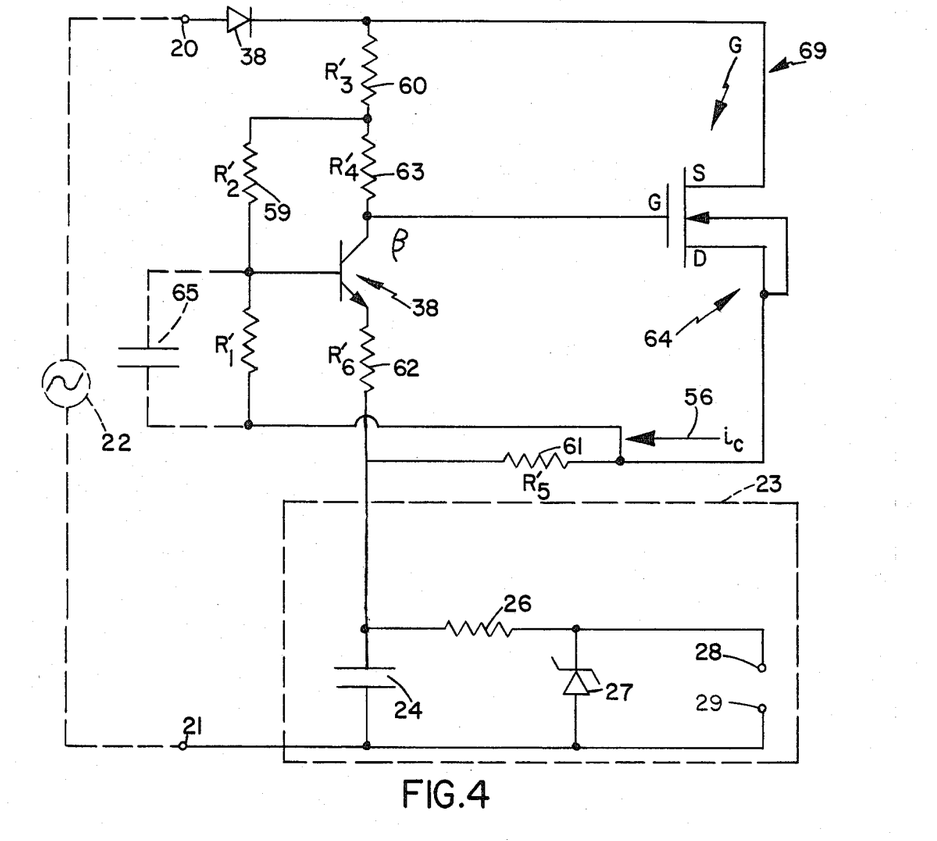
FIG. 4 is a circuit diagram of a fourth embodiment of a power supply according to the present invention, this embodiment including a field effect transistor.

By way of example only, typical values for circuit parameters of the regulating circuit illustrated in FIG. 4, which would be used in an exemplary integrated circuit embodiment are:

| $R_1 =$ | 8,946 ohms, | $i_a = .12$ ampere (average), |
|---|---|---|
| $R_2 =$ | 120,543 ohms, | $i_p = 5.0$ ampere (peak), |
| $R_3 =$ | 54,668 ohms, | $\beta_1 = 100$ (current gain, control stage), |
| $R_4 =$ | 13,667 ohms, | $\beta_2 = 200,000$ (current gain, current |
| $R_5 =$ | .385 ohms, | amplifier). |

It is to be appreciated that the individual values for the resistances $R_1$–$R_4$ can vary considerably, as a practical matter by about ±20 percent, the exact values for resistances $R_1$–$R_4$ not being nearly as important as the ratios among them. The ratios of $R_1$:$R_4$, $R_2$:$R_4$ and $R_3$:$R_4$, in a practical case, should desirably be within the range of substantially ±5 percent and preferably substantially ±1 percent. These criteria make it possible to realize the charging circuit 57 of FIG. 3 as an integrated circuit using diffusion techniques. It is conceived that the integrated circuit, in an exemplary practical realization can be contained within a small housing preferably of cylindrical shape and having a length of about 3/16 inch and a diameter of about 5/36 inch. Two concentric wire leads each of about one inch can be provided to extend from the housing. The smoothing circuit 23, except for the storage capacitor 24, may be and preferably is part of the integrated circuit.

Accordingly, expressing the above-mentioned ratios as constants $K_1$, $K_2$ and $K_3$, respectively, we have: $K_1 = 0.65 \pm 0.03 = R_1/R_4$, $K_2 = 8.82 \pm 0.44 = R_2/R_4$, and $K_3 = 4.00 \pm 0.20 = R_3/R_4$; or, as the preferred case is, $K_1 = 0.65 \pm 0.006$, $K_2 = 8.82 \pm 0.088$ and $K_3 = 4.00 \pm 0.04$.

The fifth resistance $R_5$ need not be in a particular ratio with respect to the other resistances and can readily be formed by metallization and be constituted by a metal contact to or between circuit points. The resistance $R_5$ is desirably a positive temperature coefficient (PTC) resistance, which increases in value as temperature increases, thus limiting current flow. The size of resistance $R_5$, relative to the sizes of resistances $R_1$–$R_4$, is very small. The resistance $R_5$ acts to stabilize the current regulating circuit which, in a practical case, operates at a temperature of about 125° C. during battery charging when the chip is provided with a suitable thermal mounting. Charging current will decrease with an increase in ambient temperature of approximately forty-five hundredths of one percent (0.45%) per degree Centigrade.

The circuit shown in FIG. 3, operates in the same fashion as those circuits illustrated in FIGS. 1A, 1B and 2 so far as the above-set-out description of the operation of these circuits are concerned, references being made to FIGS. 5A-5C; accordingly these need not be repeated at this point.

As illustrated in FIG. 4, like reference numerals designating like circuit components as those in FIGS. 1A, 1B, 2 and 3, the illustrative, fourth embodiment of a power supply constructed in accordance with the present invention includes a current regulating circuit having a pair of terminals 20, 21 which are shown, for purposes of illustration, connected across a conventional, 117 volt, 60 Hz voltage source 22. Also shown in FIG. 4 is a smoothing circuit 23 which includes a 1000 μf storage capacitor 24, which may be an electrolytic capacitor connected between the terminal 21 and the emitter of a transistor 38 via its emitter bias resistor. A 56 ohm resistor 26 and a Zener diode 27 are connected in series across the capacitor 24, output terminals 28, 29 of the power supply being connected across the Zener diode 27 which may be realized, for example, as a 9.1 volt diode designated by the numeral ECG 5018A. The current regulating circuit designated generally by the numeral 69 is connected in series with the capacitor 24 across the A.C. source 22, via the terminals 20, 21.

The current regulating circuit 69, as illustrated in FIG. 4, can be used to charge the capacitor 24 from 117 volt, 60 Hz power supplies and from 234 volt, 60 Hz power supplies. It is to be appreciated, however, that the current regulating circuit illustrated in FIG. 4 can be utilized to charge capacitors of considerably different voltage levels and itself have different levels and/or supply frequency, the above-mentioned levels and frequency being set out by way of example only. The current regulating circuit 58 includes, a first resistor 58 (resistance $R'_1$) and a second resistor 59 (resistance $R'_2$), a third resistor 60 (resistance $R'_3$) which is included if internal feedback is desired, and a fifth resistor 54 (resistance $R'_5$) in series with a rectifying diode 36 connected between a terminal 20, connected to an A.C. source 22, and one end of the resistor 60 (alternatively, the rectifying diode may be connected, as illustrated by rectifying diode 36' as illustrated in FIG. 1B). A further resistor 62 (resistance $R'_6$) is connected between the emitter of the transistor 38 and one plate of the capacitor 24 or to anode of the rectifying diode 36', were the circuit of FIG. 4 modified by placing the rectifying diode as shown in FIG. 1B. As illustrated, the rectifying diode 36 has its anode connected to the terminal 20 and its cathode connected to one end of the third resistor 60. A fourth resistor 63 (resistance $R'_4$) is connected between the connection of the second resistor 59 and the third resistor 60 and the collector of the NPN transistor 38, which has its emitter connected to the capacitor 24, via the further resistor 62, and, via the fifth resistor 61, to one end of the first resistor 58, which has its other end connected to the base of the transistor 38, as well as to one end of the second resistor 59. The transistor 38 and the resistors 58–63 constitute the control stage of the current regulating circuit 69. In the event the third resistor 60 is not present, the resistance $R_3$ being zero, and the ends of the resistor 59 and the resistor 63 not connected to electrodes of the transistor 38 would be connected directly to the cathode of the diode 36 or to the terminal 20 in the event the diode is positioned as diode 36', shown in FIG. 1B. Only external feedback would be provided were the value of resistance $R'_3$ zero. The collector of the transistor 38 is connected, in turn, to the gate electrode (G) of a field-effect-transistor (FET), preferably a metal oxide, silicon field-effect-trasistor (MOSFET) 64. The MOSFET 64 is selected so as to provide a relatively high transconductance (G) of about two mhos while the transistor 38 of the control stage is selected to also have in circuit a relatively high current gain ($\beta$), for example, a gain of about 100. The source electrode (S) of the MOSFET 64 is connected to the cathode of the rectifying diode 36 (or to the terminal 20 if the diode is positioned as shown in FIG. 1B). The gate of the MOSFET 64 is connected to the collector of the transistor 38. The drain electrode (D) of the MOSFET 64 is connected to the one plate of the capacitor 24 (or to the anode of the rectifying diode 36 if the diode is positioned as shown in FIG. 1B) and to the emitter of the control transistor 38, via the fifth resistor 61. The substrate of the MOSFET 64 is conductively connected to its drain electrode (D). The current regulating circuit 58 illustrated in FIG. 4 is provided with external feedback between the output of the amplifier constituted by the MOSFET 64 and the switching transistor 38 via the fifth resistor 61 which has its end not connected to the stationary contact 31 (or the anode of the diode 36' were the variant feature of FIG. 1B used) connected to that end of the first resistor 58 which is not connected to the base of the transistor 38. Additional internal feedback is provided, as in the embodiment illustrated in FIG. 2, but virtue of the third resistor 60 because of its coupling to the base of the transistor 38, as illustrated.

To avoid the circuit going into oscillation, a small capacitor 65 for example, a 1200 $\mu f$ capacitor, may be connected in parallel with the resistor 58.

Again, by way of example only, typical values for circuit parameters of the current regulating circuit illustrated in FIG. 4, which could be used in an integrated circuit embodiment are:

| | | | |
|---|---|---|---|
| $R'_1 =$ | 3,900 ohms, | $i_a =$ | .12 ampere (average), |
| $R'_2 =$ | 100,000 ohms, | $i_p =$ | 5.0 ampere (peak), |
| $R'_3 =$ | 18,000 ohms, | $\beta =$ | 100 (current gain, control stage), |
| $R'_4 =$ | 36,000 ohms, | $G =$ | 2.0 mhos (transconductance |
| $R'_5 =$ | .07 ohms, | | of MOSFET amplifier). |
| $R'_6 =$ | 270 ohms, | | |

As in other embodiments, in the embodiment illustrated in FIG. 4, the individual values for the resistances $R'_1$–$R'_4$ can vary considerably, as a practical matter by about ±20 percent, the exact values for resistance $R'_1$–$R'_4$ not being as important as the ratios among them. The ratios of $R'_1:R'_4$, $R'_2:R'_4$ and $R'_3:R'_4$, in a practical case should desirably be within the range of substantially ±5 percent and preferably substantially ±1 percent. These criteria make it possible to realize the current regulating circuit portion of the circuit of FIG. 4 as an integrated circuit using diffusion techniques, the same dimensional characteristics mentioned in conjunction with the other embodiments applying equally well to this embodiment. Accordingly, expressing the above-mentioned ratios as constants $K'_1$, $K'_2$, and $K'_3$, respectively, we have $K'_1=0.57\pm0.03=R'_1/R'_1$, $K'_2=7.69\pm0.38=R'_2/R'_4$, and $K'_3=4.00\pm0.20=R'_3/R'_4$; or, as the preferred case is, $K'_1=0.57\pm0.066$, $K'_2=7.69\pm0.076$ and $K'_3=4.00\pm0.04$.

The resistance $R'_5$ need not be in a particular ratio with respect to the other resistances and can easily be formed by metallization and be constituted by a metal contact to or between circuit points. As in the case of the other embodiments, the resistance $R'_5$ is desirably, a positive temperature coefficient (PTC) resistance, which increases in value as the temperature increases, thus limiting the current flow and serving to stabilize the circuit which in a practical integrated circuit version may operate at a chip temperature of about 125° F. during battery charging when the chip is provided with a suitable thermal mounting. The PTC resistor 61 ($R'_5$) is preferably formed by metallization with materials which are selected so that the resistor will also function as a fuse, allowing the circuit to fail without damaging the capacitor undergoing charging, its associated circuit components and/or the device or devices which may be connected to the output terminals 28, 29. Charging current will decrease with an increase in ambient temperature of approximately ¼ percent per degree Fahrenheit. The resistor 62, serving principally as a biasing resistor for the transistor 38 need not be in any particular ratio relationship to the resistances $R_1$–$R_4$.

The power supply circuit illustrated in FIG. 4 operates in much the same fashion as the circuits illustrated in FIG. 2, the MOSFET 64 (FIG. 4) being turned on and off by the control stage, which includes the transistor 38, as the Darlington configuration of transistors 39–42 (FIG. 2). A detailed discussion of the operation does not appear to be necessary for the waveforms shown in FIGS. 5A–5C are produced by the circuit of FIG. 4 in much the same fashion as the circuit of FIG. 2.

The circuit of FIG. 4, operates essentially as the circuit of FIG. 2 insofar as the waveforms allows in FIGS. 5A–5C are concerned; according, no detailed discussion of the sequence of operation need be repeated at this point.

In operation, the external feedback provided by the fifth resistor 61 as connected and the internal feedback provided by the third resistor 60, if present as connected can be considered, in effect, to vary the resistance of the control stage and cause its active component, transistor 38, to limit current flow in the MOSFET 64 to periods when relatively low voltages are present and to, in effect, turn the MOSFET 64 off during times higher voltages are present.

Figure 6:
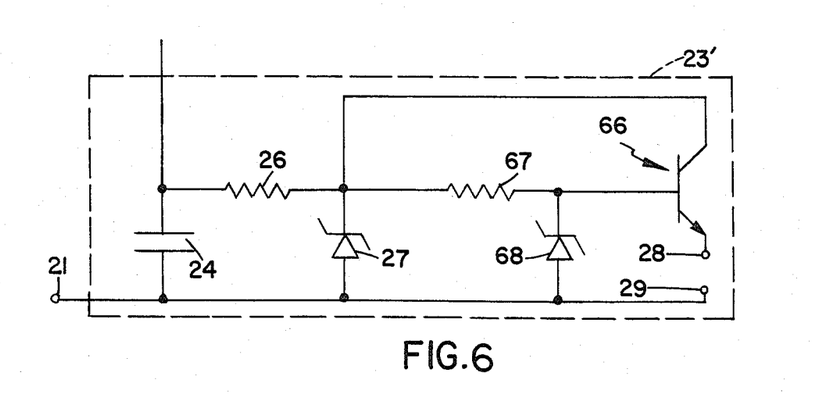
FIG. 6 is a circuit diagram of an active component smoothing circuit which may be used as a substitute for the passive smoothing circuit used in the embodiments of the power supplies illustrated in FIGS. 1A, 1B and 2-4.

Referring to FIG. 6, an active smoothing circuit 23' is illustrated. It may be substituted for the smoothing circuit 23 mentioned in connection with the embodiments and variants shown in FIGS. 1A, 1B, 2, 3 and 4. The circuit of FIG. 6 includes, in addition to the circuit elements of smoothing circuit 23 an npn transistor 65, which may be an ECG 198, having its collector-emitter electrode path connected in series with the Zener diode 27 which, in this case, may be a 12 volt diode available under the designation ECG 5127A, a resistive conductive connection extending between the cathodes of the Zener diode 27 and the cathode of a Zener diode 68 which, in this case, may be a 9.1 volt diode available under the designation ECG 5018A, this connection including a 330 ohm resistor 67. The resistor 26 may be realized as a 33 ohm resistor and the storage capacitor 24 as a 1000 μf capacitor. The collector of the transistor 66 is conductively connected to a circuit point between the resistor 67 and the Zener diode 27, this point being conductively connected to the collector of the transistor 66. The smoothing circuit 23' illustrated in FIG. 6, as well as the smoothing circuit 23 shown in other figures, provides a maximum output current of about 0.12 ampere, its output ripple voltage, in both cases, in the output range is less than one millivolt peak-to-peak.

Figure 7:
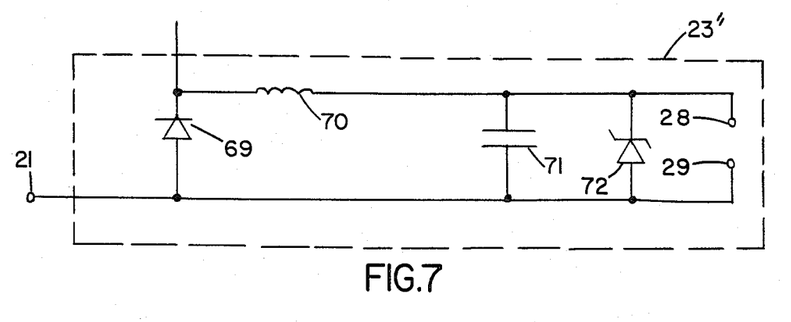
FIG. 7 is a circuit diagram of a passive smoothing circuit which may be substituted for the smoothing circuit used in the embodiments of the power supply illustrated in FIGS. 1A, 1B and 2-4.

As illustrated in FIG. 7, a passive smoothing circuit 23'', which may be substituted for the smoothing circuits 23 and 23', includes a flyback diode 69 having its anode connected to one terminal 21 of the A.C. source, its cathode being connected to one end of an inductor 70. The other end of the inductor 70 is connected to one plate of a storage capacitor 71 which has its other plate connected to the anode of the flyback diode 69 and the terminal 21. A Zener diode 72 is connected across the capacitor 72, the Zener diode being poled in the same fashion as the flyback diode 69. A pair of output terminals 28,29 are connected across the capacitor 71. The components of the circuit illustrated in FIG. 7, except for the capacitor 71 and inductor 70 may be and preferably are formed on the same chip as the other circuit components as an integrated circuit. In many instances, it may be desirable from commercial considerations to not form any of the components of the circuit 23'' as a part of a chip, electing to use other conventional techniques to form the circuit 23'', such as using circuit boards and the like.

It is to be understood that the foregoing description and accompanying figures of drawing have been set out by way of example, not by way of limitation. Numerous other embodiments and variants of the power supply circuit are possible, without departing from the spirit and scope of the present invention, its scope being defined by the appended claims.

What is claimed is:

1. In a power supply which includes smoothing circuit means, a current regulating circuit comprising rectification means, amplification means and a feedback control circuit comprising solid state means having first, second and third terminals, the third terminal being a control terminal, a first resistance having one end thereof coupled to said first terminal and the other end thereof connected to the control terminal of the solid state means, a second resistance having one end thereof connected to the control terminal and a third resistance in a series circuit with the smoothing circuit means and the rectification means, one end of said third resistance being connected to the other end of the second resistance, a fourth resistance connected between the second terminal of the solid state means and the one end of the third resistance, and wherein the individual resistance values of the four resistances can vary substantially and are not nearly as important as the ratios between the first, second and third resistances to the fourth resistance, respectively.

2. The combination of claim 1, further including a fifth current sensing resistance between the amplification means and the feedback control circuit.

3. The combination of claim 2, wherein the fifth resistance is a positive temperature coefficient resistance which increases in value as the temperature increases, thereby limiting the current flow to the smoothing circuit means.

4. The combination of claim 2 wherein the fifth resistance has a relatively small value and serves as a fuse for fail safe operation of the circuit.

5. The combination of claim 1, wherein the smoothing circuit means comprises storage capacitance means.

6. The combination of claim 5, including a further resistance and at least one Zener diode connected in series with one another across the storage capacitance means whereby a substantially constant voltage is available across the at least one Zener diode.

7. The combination according to claim 1, wherein said rectification means includes at least one rectifying diode, the at least one rectifying diode having one of its electrodes connected to the other end of the third resistance.

8. The combination of claim 1, wherein said rectification means includes at least one rectifying diode and said smoothing circuit means comprises storage capacitance means, the at least one rectifying diode being connected in series with and between said storage capacitance means and the second terminal of the solid state means.

9. In a power supply which includes smoothing circuit means, a current regulating circuit comprising rectification means, amplification means and a feedback control circuit comprising solid state means having first, second and third terminals, the third terminal being a control terminal, a first resistance having one end thereof coupled to said first terminal and the other end thereof connected to the control terminal of the solid state means, a second resistance having one end thereof connected to the control terminal and a third resistance in a series circuit with the smoothing circuit means and the rectification means, one end of said third resistance being connected to the other end of the second resistance, wherein the smoothing circuit means comprises storage capacitance means, including a further resistance and at least one Zener diode connected in series with one another across the storage capacitance means whereby a substantially constant voltage is available across the at least one Zener diode, and further including at least one transistor having its collector-emitter path connected in series with output terminal means across the at least one Zener diode, and an additional resistance and at least one further Zener diode connected in series with one another across the at least one Zener diode, the at least one transistor having its base electrode connected to a circuit point between the at least one further Zener diode and the additional resistance.

10. In a power supply which includes smoothing circuit means, a current regulating circuit connected in series with the smoothing circuit means and including rectification means, amplification means, and feedback control circuit means having solid state means having first, second and third terminals, the third terminal constituting a control terminal, a first resistance having one end thereof coupled to the first terminal and the other end thereof connected to the control terminal of the solid state means, a second resistance having one end thereof connected to the control terminal, a third resistance connected in a series circuit which includes the smoothing circuit means and the rectification means, one end of the third resistance being connected to the other end of the second resistance, a fourth resistance having one end thereof connected to the one end of the third resistance and the other end thereof connected to the second terminal of the solid state means, the arrangement being such that the individual values of the four resistances can vary substantially and are not nearly as important as the ratios between the first, second and third resistances to the fourth resistance, respectively, and a fifth current sensing resistance between the amplification means and the control circuit, the fifth resistance having a positive temperature coefficient of resistance and increasing in value as the temperature increases, thereby limiting the current flow, the fifth resistance having a relatively small value compared to the value of the other resistances and serving as a fuse for fail safe operation of the circuit.

11. The combination of claim 10, wherein the amplication means comprises a plurality of transistors arranged in a Darlington array as a current amplifier.

12. The combination of claim 10, wherein the solid state means in the control circuit comprises a junction transistor having a collector-emitter path and a base-emitter path, the base-emitter path being connected in parallel with the first resistance, and the collector-emitter path being connected in parallel with the amplification means.

13. The combination of claim 10, wherein said smoothing circuit means comprises storage capacitance means.

14. The combination of claim 13, including a further resistance and at least one Zener diode connected in series with one another across the storage capacitance means whereby a substantially constant voltage is available across the at least one Zener diode.

15. The combination according to claim 14, including at least one transistor havings its collector-emitter path connected in series with output terminal means across the at least one Zener diode, and an additional resistance and at least one further Zener diode connected in series with one another across the at least one Zener diode, the at least one transistor having its control electrode connected to a circuit point between the at least one further Zener diode and the additional resistance.

16. The combination of claim 10, wherein said rectification means includes at least one rectifying diode, the at least one rectifying diode having one of its electrodes connected to the one end of the third resistance.

17. The combination of claim 10, wherein said rectification means includes at least one rectifying diode and said smoothing circuit means comprises a storage capacitance means, the at least one rectifying diode being connected in series with and between said storage capacitance means and the second terminal of the solid state means.

18. In a power supply which includes smoothing circuit means and rectification means, terminal means for connection to an electric power source, an electrical charging circuit and means for connecting the smoothing circuit means in series with said charging circuit across said terminal means; the improvement wherein: said charging circuit comprises a first resistance, a second resistance and a third resistance connected in series circuit in denominated order, this series circuit being in series with said rectification means; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a plurality of additional transistors connected in a Darlington configuration and including a second transistor and a final transistor, said first transistor and said second transistor having their respective collector and base conductively connected and each of said additional transistors having its collector coupled to that end of said third resistance which is remote from the circuit point between said second resistance and said third resistance; and a fifth resistance, said last transistor and said first transistor having their emitters connected via said fifth resistance, and wherein ratios of said first resistance ($R'_1$) said second resistance ($R'_2$) and said third resistance ($R'_3$) to said fourth resistance ($R'_4$) are defined as follows:

$R'_1 = K'_1 R'_4$ $R'_2 = K'_2 R'_4$ $R'_3 = K'_3 R'_4$;

where $K'_1 = 0.57 \pm 0.03$, $K'_2 = 7.69 \pm 0.38$ and, $K'_3 = 4.00 \pm 0.20$.

19. An improved power supply according to claim 18, wherein said first resistance is connected between base and emitter of said first transistor via said fifth resistance, thereby providing feedback.

20. An improved power supply according to claim 18 where: $K'_1 = 0.57 \pm 0.006$, $K'_2 = 7.69 \pm 0.076$ and, $K'_3 = 4.00 \pm 0.04$.

21. An improved power supply according to claim 18, wherein said smoothing circuit means comprises storage capacitance means.

22. An improved power supply according to claim 21, including a further resistance and at least one Zener diode connected in series with one another across the storage capacitance means whereby a substantially constant voltage is available across the at least one Zener diode.

23. In a power supply which includes smoothing circuit means and rectification means, terminal means for connection to an electric power source, an electrical charging circuit and means for connecting the smoothing circuit means in series with said charging circuit across said terminal means; the improvement wherein; said charging circuit comprises a first resistance, a second resistance and a third resistance connected in series circuit in denominated order, this series circuit being in series with said rectification means; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a plurality of additional transistors connected in a Darlington configuration and including a second transistor and a final transistor, said first transistor and said second transistor having their respective collector and base conductively connected and each of said additional transistors having its collector coupled to that end of said third resistance which is remote from the circuit point between said second resistance and said third resistance; and a fifth resistance, said last transistor and said first transistor having their emitters connected via said fifth resistance, and
wherein ratios of said first resistance ($R_1$), said second resistance ($R_2$), and said third resistance ($R_3$) to said fourth resistance ($R_4$) are defined as follows:

$R_1 = K_1 R_4$ $R_2 = K_2 R_4$ $R_3 = K_3 R_4$;

where $K_1 = 0.65 \pm 0.03$, $K_2 = 8.82 \pm 0.44$ and, $K_3 = 4.00 \pm 0.20$.

24. An improved power supply according to claim 23, where: $K_1 = 0.65 \pm 0.006$, $K_2 = 8.82 \pm 0.088$ and, $K_3 = 4.00 \pm 0.040$.

25. An improved power supply according to claim 23, wherein said first resistance is connected between base and emitter of said transistor, exclusive of said fifth resistance.

26. An improved power supply according to claim 23, wherein said smoothing circuit means comprises storage capacitance means.

27. An improved power supply according to claim 26, including a further resistance and at least one Zener diode connected in series with one another across the storage capacitance means whereby a substantially constant voltage is available across the at least one Zener diode.

28. In a power supply which includes smoothing circuit means and rectification means, terminal means for connection to an electric power source, an electrical charging circuit and means for connecting the smoothing circuit means in series with said charging circuit across said terminal means; the improvement wherein: said charging circuit comprises a first resistance, a second resistance and a third resistance connected in series circuit in denominated order, this series circuit being in series with said rectification means; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a plurality of additional transistors connected in a Darlington configuration and including a second transistor and a final transistor, said first transistor and said second transistor having their respective collector and base conductively connected and each of said additional transistors having its collector coupled to that end of said third resistance which is remote from the circuit point between said second resistance and said third resistance; and a fifth resistance, said last transistor and said first transistor having their emitters connected via said fifth resistance,
wherein said smoothing circuit means comprises storage capacitance means,
including a further resistance and at least one Zener diode connected in series with one another across the storage capacitance means whereby a substantially constant voltage is available across the at least one Zener diode, and further including at least one further transistor having its collector-emitter path connected in series with output terminal means across the at least one Zener diode, and an additional resistance and at least one further Zener diode connected in series with one another across the at least one Zener diode, the at least one further transistor having its base electrode connected to a circuit point between the at least one further Zener diode and the additional resistance.

29. An improved power supply according to claim 28, wherein said rectification means includes at least one rectifying diode having one of its electrodes connected to one end of said third resistance.

30. An improved power supply according to claim 28, wherein said rectification means includes at least one rectifying diode, the at least one rectifying diode being connected in series with and between said storage capacitance means and said collector-emitter path of said first transistor.

31. In a power supply which includes smoothing circuit means, a control circuit comprising the combination of a first resistance, a second resistance, and a third resistance connected in series with each other, a transistor having a collector, emitter and base, the base being connected to the junction of the first and second resistances, the emitter being connected to the other end of the first resistance, and a fourth resistance having one end thereof connected to the junction of the second and third resistances and the other end thereof connected to the collector of the transistor, wherein the individual values of the first, second, third and fourth resistances can vary substantially without affecting the performance of the control circuit, and wherein the exact values of said resistances are substantially less important than the ratios therebetween.

32. The combination of claim 31, wherein the values of said resistances can vary by approximately plus or minus 20 percent, and wherein the ratios of the first, second and third resistances to the fourth resistances, respectively, are within the range of approximately plus or minus 5 percent.

33. The combination of claim 31, further comprising at least one diode having one of its electrodes connected to the other end of the third resistance.

34. The combination of claim 33, further comprising a plurality of additional transistors connected in a Darlington configuration and including a second transistor and a final transistor, said transistor in said control circuit and said second transistor in said Darlington configuration having their respective collector and base conductively coupled, each of said additional transistors having its collector coupled to a circuit point between said third resistance and an electrode of said diode, and a fifth resistance, said last transistor in said Darlington configuration and said transistor in said control circuit having their emitters connected via said fifth resistance.

35. The combination of claim 34, wherein the value of the fifth resistance is relatively small compared to the first, second, third and fourth resistance.

36. The combination of claim 35, wherein the fifth resistance comprises a positive temperature coefficient resistance which increases in value as the temperature increases, thereby limiting the current flow.

37. The combination of claim 31, wherein the smoothing circuit means comprises storage capacitance means.

38. In a power supply which includes smoothing circuit means, a circuit means for supplying current pulses thereto, the means for supplying current pulses comprising a combination of a control circuit, an amplifier circuit, and a current sensing resistor therebetween, the current sensing resistor having a relatively low value, said smoothing circuit means comprising storage capacitance means, and
including a further resistance and at least one Zener diode connected in series with one another across the storage capacitance means whereby a substantially constant voltage is available across the at least one Zener diode, and further
including at least one transistor having its collector-emitter path connected in series with output terminal means across the at least one Zener diode, and an additional resistance and at least one further Zener diode connected in series with one another across the at least one Zener diode, the at least one further transistor having its base electrode connected to a circuit point between the at least one further Zener diode and the additional resistance.

39. An improved power supply according to claim 38 including rectification means comprising at least one rectifying diode having one of its electrode connected to one end of said third resistance.

40. An improved power supply supply according to claim 38, including rectification means comprising at least one rectifying diode, the at least one rectifying diode being connected in series with and between said smoothing circuit means and said collector-emitter path of said transistor.

41. In a power supply comprising terminal means for connection to an electric power source, an electrical charging circuits, smoothing circuit means and means for connecting the smoothing circuit means in series with said charging circuit across said terminal means, the improvement wherein: said charging circuit comprises a first resistance, a second resistance, a third resistance and rectifying means including at least one diode connected in series, a first transistor having a collector-emitter path and a base-emitter path, said base-emitter path being connected in parallel with said first resistance, a fourth resistance, said fourth resistance being connected in series with said collector-emitter path and a circuit point between said second resistance and said third resistance, a plurality of additional transistors connected in a Darlington configuration and including a second transistor and a final transistor, said first transistor and said second transistor having their respective collector and base conductively connected, and each of said additional transistors having its collector coupled to a circuit point defined by that end of said third resistance, which is remote from the circuit point between said second resistance and said third resistance, and a fifth resistance, said first transistor and said last transistor having their emitters connected via said fifth resistance, wherein the respective individual values of said first, second, third and fourth resistances can vary substantially and are not nearly as important as the ratios between said first, second and third resistance to said fourth resistance, respectively, and wherein said fifth resistance is very small compared to said other resistances.

42. An improved power supply according to claim 41, wherein said smoothing circuit means comprises storage capacitance means.

43. In a power supply having terminal means for connection to an electric power source, an electrical charging circuit, smoothing circuit means, and means for connecting the smoothing circuit means in series with said charging circuit across said terminal means; the improvement wherein: said charging circuit comprises a first resistance, a second resistance and a third resistance connected in series in denominated order as a combination and rectifying means including at least one diode connected in series with the combination; a control transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; and means having a control electrode and controllable charging current carrying electrodes, said charging current carrying electrodes being connectable in series with said diode, and said control transistor having its collector coupled to said control electrode, and
wherein ratios of said first resistance ($R'_1$), said second resistance ($R'_2$) and said third resistance ($R'_3$) to said fourth resistance ($R'_4$) are defined as follows:

$R'_1 = K'_1 R'_4$ $R'_2 = K'_2 R'_4$ $R'_3 = K'_3 R'_4$;

where $K'_1 = 0.57 \pm 0.03$, $K'_2 = 7.69 \pm 0.38$ and, $K'_3 = 4.00 \pm 0.20$.

44. An improved power supply according to claim 43, including a fifth resistance, said emitter of said control transistor and one of said charging current carrying electrodes being connected via said fifth resistance.

45. An improved power supply according to claim 44, wherein said first resistance is connected between base and emitter of said control transistor via said fifth resistance, thereby providing feedback.

46. An improved power supply according to claim 45, wherein said means having a control electrode and current carrying electrodes comprise a field effect transistor.

47. An improved power supply according to claim 46 wherein said field effect transistor is a MOSFET.

48. An improved power supply according to claim 43, where: $K'_1=0.57\pm0.006$, $K'_2=7.69\pm0.076$ and, $K'_3=4.00\pm0.040$.

49. An improved power supply according to claim 43, wherein said means having a control electrode and current carrying electrodes comprise a field effect transistor.

50. An improved power supply according to claim 49, wherein field effect transistor is a MOSFET.

51. An improved power supply according to claim 43, wherein the smoothing circuit means comprises storage capacitance means.

52. In a power supply having terminal means for connecting to an electric power source, an electrical charging circuit, smoothing circuit means, and means for connecting the smoothing circuit means in series with said charging circuit across said terminal means; the improvement wherein: said charging circuit comprises a first resistance, a second resistance and a third resistance connected in series in denominated order as a combination and rectifying means including at least one diode connected in series with the combination; a control transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; and means having a control electrode and controllable charging current carrying electrodes, said charging current carrying electrodes being connectable in series with said diode, and said control transistor having its collector coupled to said control electrode, including a fifth resistance, said emitter of said control transistor and one of said charging current carrying electrodes being connected via said fifth resistance, wherein said first resistance is connected between the base and emitter of said control transistor, exclusive of said fifth resistance, and wherein ratios of said first resistance ($R'_1$), said second resistance ($R_2$) and said third resistance ($R_3$) to said fourth resistance ($R_4$) are defined as follows:

$R_1=K_1R_4$ $R_2=K_2R_4$ $R_3=K_3R_4$;

where $K_1=0.65\pm0.03$, $K_2=8.82\pm0.44$ and, $K_3=4.00\pm0.20$.

53. An improved power supply according to claim 52, where: $K_1=0.65\pm0.006$, $K_2=8.82\pm0.088$ and, $K_3=4.00\pm0.04$.

54. An improved power supply according to claim 52, including a fifth resistance, said emitter of said control transistor and one of said charging current carrying electrodes being connected via said fifth resistance, and wherein said first resistance is defined by one resistor and a second resistor connected in parallel with one another, said one resistor being connected between base and emitter of said control transistor exclusive of said fifth resistance, and said second resistor being connected between control transistor via said fifth resistance.

55. A power supply comprising rectifying circuit means for supplying unfiltered rectified voltage, controlling circuit means for producing current pulses and smoothing circuit means for providing D.C. output connected in series, said controlling circuit means being responsive to instant amplitude of the unfiltered rectified voltage to pass current to said smoothing circuit means during periods when the rectified voltage is between a first level defined by voltage across the smoothing circuit means and a higher second level and to block current to said smoothing circuit means during periods when the rectified voltage is greater than the second level.

56. A power supply according to claim 55 wherein said smoothing circuit means comprises at least one storage capacitance.

* * * * *